United States Patent
Okamoto et al.

[15] 3,658,389
[45] Apr. 25, 1972

[54] SAFETY DEVICE IN ANTISKID CONTROL SYSTEM FOR AUTOMOBILES

[72] Inventors: Atutosi Okamoto, Toyohashi-shi; Koichi Taniguchi, Kariya-shi; Yoshiaki Nakano, Gifu-shi; Koichi Toyama, Toyohashi-shi, all of Japan

[73] Assignee: Nippon Denso Company Limited, Kariya-shi, Japan

[22] Filed: May 16, 1969

[21] Appl. No.: 825,307

[30] Foreign Application Priority Data

June 17, 1968 Japan..............................43/41733

[52] U.S. Cl. .................303/21 CG, 188/181 A, 303/21 EB
[51] Int. Cl. .................................................B60t 8/12
[58] Field of Search ..........................303/21, 6, 61–63, 303/68–69; 188/181

[56] References Cited

UNITED STATES PATENTS 2,402,403  6/1946  Hines.....................................303/21
2,869,687  1/1959  Keim et al...........................303/21 X
3,494,671  2/1970  Slavin et al..........................303/21 P
3,507,544  4/1970  Wakamatsu et al................303/21 CG Primary Examiner—Milton Buchler
Assistant Examiner—John J. McLaughlin
Attorney—Cushman, Darby & Cushman

[57] ABSTRACT

In a antiskid control system for automobiles having two braking force control circuits arranged in parallel, these two lines of control circuits are connected to a control relay of a braking force release solenoid valve such that the braking force may be relieved only when said two control circuits provide a braking force release signal simultaneously. SUch being the case, should any one of the two braking force control circuit lines go wrong in such a manner as to cause a braking force release signal, at least the minimum function is ensured of adjusting the braking force by pressure of a foot with the aid of the working of the other control circuit line to thereby provide extraordinary safety against any accidents that may otherwise result in disaster.

1 Claims, 1 Drawing Figure

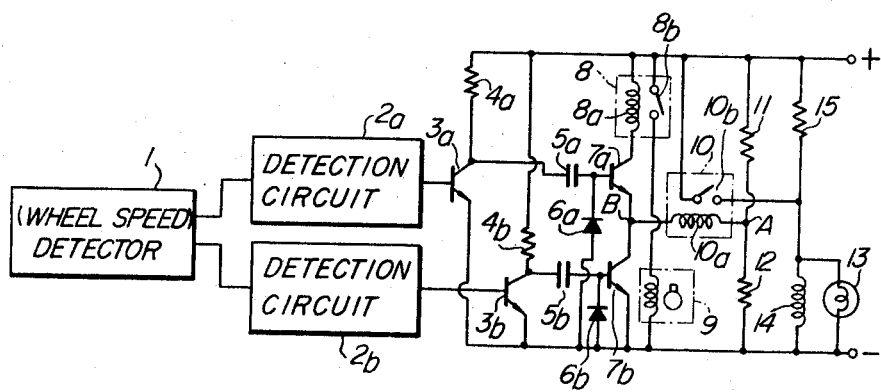

SAFETY DEVICE IN ANTISKID CONTROL SYSTEM FOR AUTOMOBILES

BACKGROUND OF THE INVENTION

1. FIELD OF THE INVENTION

The present invention relates generally to an antiskid control system for automobiles and more particularly to a safety device in such antiskid control system. The safety device is intended to provide improved reliability in the event of failure and has for its object the safe application of the brakes to the car through automatic control of the braking force according to the state of brake application or release.

2. DESCRIPTION OF THE PRIOR ART

In the prior art antiskid control systems, the failure of a braking force control circuitry in such a manner as to release the braking force as well as the provision of a braking force release signal by such control circuitry cause an action indicating alarm device, such as a lamp and a buzzer, to operate to indicate the failure of the braking force control circuitry in addition to the releasing of the braking force by the antiskid action. Accordingly, when the braking force control circuitry has gone wrong so that the braking force is kept releasing before the actuation of the antiskid control system, that is, before the application of brakes to the car, the operation of the action indicating alarm device warns about the failure of the braking force control circuitry so that there will be sufficient time to disconnect the antiskid control system from the power supply and the occurrence of inefficient braking of the car due to failure of the braking force control circuitry can thus be prevented. There will not be, however, sufficient time to break the connection between the power source and the antiskid control system when the braking force control circuitry has failed for one cause or another (for example, breaking of a resistor or transistor breakdown) while the brakes were being applied to the car. Even if there were sufficient time, it would be extremely difficult to disconnect the antiskid control system from the power supply by determining instantaneously whether the releasing of the braking force was caused by the failure of the braking force control circuitry or the actual braking force release signal. For that reason, there has been a problem in that the utilization of an antiskid control system is accompanied with a feeling of serious apprehension because there is the great possibility that should the braking force control circuitry fail by any chance while the brakes are being applied to the car, it may give rise to a serious accident as no effective braking of the car can be provided.

SUMMARY OF THE INVENTION

Therefore, it is an object of the present invention to provide a safety device used in an antiskid control system for automobiles which comprises two lines of braking force control circuits arranged in parallel in the antiskid control system. The two lines of braking force control circuits are connected to a control relay of a braking force release solenoid valve such that the braking force is relieved only both the control circuits provide a braking force release signal simultaneously.

Another object of the present invention is to provide a safety device used in an antiskid control system characterized in that an action indicating alarm device is energized when at least one of the output transistors of both the braking force control circuits operates in such a manner as to tend to release the braking force.

According to the present invention, there is the effect that should any one line of the braking force control circuits go wrong in such a manner as to release the braking force, it is indicated by the actuation of the alarm device. There is also the effect that even if one line of the braking force control circuits fails, the control system as a whole permits at least adjustment of the braking force by pressure of a foot with the aid of the other line of the braking force control circuits.

In particular, the present invention is quite useful in actual practice in view of the fact that because the antiskid control system is to control the braking force of the car, a serious accident may inevitably result if ineffectiveness of braking action is caused while the brakes are being applied to the car. There is the further effect in that as the alarm device is energized when at least one of the output transistors of the two lines of the braking force control circuits operates in a manner designed to release the braking force (that is, the transistor becomes conductive according to the illustrated embodiment), should the braking force control circuits fail, even with one line of the circuits only, the driver may be warned of the failure by actuating the alarm device continuously for a certain period of time or a longer period of time. However at the same time, there will be sufficient time to repair any defective points in the braking force control circuits or replace the whole control system because, as discussed above, adjustment of the braking force at the least can be effected by pressure of a foot with the operation of the remaining control circuit having no fault.

BRIEF DESCRIPTION OF THE DRAWING

The accompanying drawing is an electrical connection diagram showing an embodiment of a safety device used in an antiskid control system for automobiles to the present invention.

DESCRIPTION OF THE PREFERRED EMBODIMENT

The present invention will be discussed hereinafter by referring to the illustrated embodiment in the accompanying drawing. In the drawing, numeral 1 designates a wheel speed detector adapted, for example, to convert the speed of a wheel into DC voltage with an AC generator and a rectifier circuit which rectifies the AC output of the generator. Numeral 2a is a detection circuit adapted to differentiate a DC voltage corresponding to the wheel speed derived from the detector 1 to detect the wheel deceleration; 3a a transistor; 4a a load resistor of the transistor 3a. Numeral 5a is a capacitor; 6a a diode; 7a an output transistor adapted to be driven by means of the transistor 3a. The circuit comprising the load resistor 4a, capacitor 5a and diode 6a forms a timing circuit to prevent the transistor 7a from continuing to be a conductor in excess of a certain period of time, for example, more than a second. One line of the braking force control circuit is formed with the aforesaid elements including the detection circuit 2a through the transistor 7a. On the other hand, another line of the braking force control circuit is formed with circuit elements including elements 2b through 7b which function in the same manner as the first-mentioned circuit elements 2a through 7a. Numeral 8 is a control relay of a braking force release solenoid valve 9 and the two lines of said braking force control circuits are arranged in parallel with their respective output transistors 7a and 7b being connected in series with respect to the control relay 8. In other words, the control relay 8 is designed to operate when both the transistors 7a and 7b conduct. The solenoid valve 9 is disposed in a hydraulic circuit of the car brake system so that it functions to relieve the hydraulic braking pressure when energized by the control relay 8. Numeral 8a is a driver coil of the relay 8 and 8b a contact; 10 an auxiliary relay, 10a and 10b are driver coil and contact of the relay 10, respectively. Numerals 11 and 12 are voltage dividing resistors and the driver coil 10a of the auxiliary relay 10 is inserted between the junction point A of these resistors and the junction point B of the emitter of transistor 7a and the collector of transistor 7b. Numerals 13 and 14 designate a lamp and a buzzer, respectively, which are connected to a source of power (not shown) through a resistor 15. The resistor 15 supplies a very small amount of current to the lamp 13 all the time so that it is normally lit dimly and thus whether or not the lamp 13 is broken can be easily perceived. It is to be noted here that the buzzer 14 is so designed that it will not make a buzzing noise with the very small current flowing through the resistor 15. These lamp 13 and buzzer 14 serve as action indicating alarm device. The operating current of the auxiliary relay 10 is predetermined to be smaller than that of the control relay 8 and the ohmic value of the resistor 12 is predetermined so that when current flows through the transistor 7a between the collector and emitter thereof, the control relay 8 does not operate but the auxiliary relay 10 operates. The ohmic value of resistor 11 is predetermined so that the potential of the junction point A is about half the value of the source voltage and therefore the auxiliary relay 10 also operates when the current flows through the transistor 7b between the collector and emitter. That is, the auxiliary relay 10 operates when either of the transistors 7a and 7b becomes a conductor.

Now the operation of the present device having the arrangement described above will be discussed. When the braking force is applied to the car and deceleration takes place in excess of the preset value, this deceleration is detected by the detection circuits 2a and 2b which in turn drive the transistors 3a and 3b to cutoff. When this happens, the base current is supplied to the transistors 7a and 7b through the resistor 4a and capacitor 5a and through the resistor 4b and capacitor 5b, respectively, and the transistors become conductors. Consequently, the transistors 7a and 7b conduct simultaneously and a sufficient amount of operating current flows through the drive coil 8a of the control relay 8. This energizes the driver coil 8a and closes the contact 8b. The braking force release solenoid valve 9 is thereupon energized and it operates in a manner designed to reduce the hydraulic brake pressure of the brake system. At this instant, the auxiliary relay 10 operates by the current flowing through the resistor 11 and through the collector and emitter of transistor 7b and the contact 10 closes. This lights the lamp 13 with a greater intensity and causes the buzzer 14 to produce a buzzing sound to indicate that the braking force on the car is being released. Then, as the acceleration of the wheel starts upon releasing of the braking force on the car and there is no longer any wheel deceleration, the outputs of the detection circuits 2a and 2b reverse the transistors 3a and 3b into the conduction state. As a result, the transistors 7a and 7b go into non-conduction simultaneously and both the control relay 8 and the auxiliary relay 10 becomes the quiescent condition. This opens the circuit to the solenoid valve 9, increasing the hydraulic brake pressure in the brake system. The lamp 13 is then caused to light dimly by the very small amount of current from the resistor 15 and the buzzer 14 stops buzzing. The antiskid action described above is to be repeated in accordance with the presence or non-presence of the wheel deceleration to provide effective braking of the car.

Now suppose that failure has taken place in the braking force control circuitry. Initially, assume that trouble has developed between the detection circuit 2a and the transistor 3a so that the transistor 3a is held at cutoff. When this occurs, the output transistor 7a remains conducting by the current flowing through the resistor 4a and the capacitor 5a. In this instance, if the circuit between the detection circuit 2b and the transistor 3b is normal, the output transistor 7b becomes conductive and non-conductive repeatedly in accordance with the output signal of the detection circuit 2b. In consequence, both the transistors 7a and 7b will not remain in the conduction state together and the braking force will be relieved only when the two transistors 7a and 7b become conductors simultaneously. Thus, it is impossible for the braking force to be relieved in a continued manner and thus normal antiskid action may be effected. Then, as the charging of capacitor 5a in the defective braking force control circuit proceeds and as a certain time, for example, one second passes, no base current is supplied to the transistor 7a and no current flows therethrough, though the transistor 3a is held at cutoff. This means that thereafter the repeated turning on and off of the transistor 7b may not cause the control relay 8 to operate and no current flows through the solenoid valve 9. After this, the brakes may thus be applied to the car by adjusting the degree of the brake pedal depression with pressure of a foot. In this way, even if the braking force control circuit fails while the brakes are being applied to the car, the car will never get out of braking and at least the braking force can be adjusted in the same way as with the normal brake system to brake the car. The driver is informed about any defect in the braking force control circuits by means the lamp 13 and buzzer 14 which continue to light brilliantly and give a buzzing sound, respectively, over a certain period of time which is determined by the resistor 4a and capacitor 5a. On the other hand, if trouble has developed in the circuit between the detection circuit 2b and the transistor 3b, this may only result in the same condition as described above provided that the circuit between the detector circuit 2a and the transistor 3a remains normal, and no ineffective braking of the car will occur.

Secondary, assume that the transistor 7a breaks down while being conductive. In this case, if the transistor 7b operates normally, this transistor 7b is turned on and off repeatedly in accordance with the output signal of the detection circuit 2b and consequently the braking force on the car may be relieved only when the transistor 7b becomes conductive. Thus, the brakes can still be applied to the car. Moreover, as the transistor 7a remains conducting irrespective of the charging of capacitor 5a, the repeated turning on and off of the other transistor 7b permits continued regular antiskid operation during application of the brakes to the car. The lamp 13 and the buzzer 14 continue to be lit and buzzing, respectively, during the brake application because the transistor 7a is left in the conduction state. This warns the driver of a failure in the braking force control circuitry. From the foregoing, it will be evident that if any one of the two lines of the braking force control circuits fails no matter what form it may take, the driver is warned of the failure by means of the lamp 13 and buzzer 14. At the same time, at least the braking force may be controlled by pressure of a foot to apply the brakes to the car. On the other hand, if the transistor 7b fails to operate so that it conducts current therethrough even when the deceleration signal does not exist and transistor 7a operates normally, then the same results as described above are obtained.

Hereinbefore an explanation has been given of the instances where both the transistors 7a and 7b fail in such a manner as to cause current flow therethrough. If, however, both the transistors 7a and 7b go wrong so that no current flows therethrough, there will be almost no problem because such failures may be of some form or other which will not energize the braking force release solenoid valve 9, that is, they may assume the form of faults that will not result in ineffectiveness of the brake application to the car.

Although in the embodiment described above the auxiliary relay 10 is inserted between the junction point A of the resistors 11 and 12 and the junction point B of the emitter of transistor 7a and the collector of transistor 7b so as to control the lamp 13 and buzzer 14, a highly sensitive buzzer (operable with low voltage and low current) may be employed between said junction points A and B in place of the auxiliary relay 10.

We claim:

1. A safety device in an anti-skid control system for vehicles having wheels, brakes and means for applying a braking force thereto, said safety device comprising:
 two parallel circuits for providing respective braking force releasing signals responsive to wheel skid condition,
 means in circuit with said parallel circuits for releasing the braking force only when both of said releasing signals are provided simultaneously thereby avoiding brake force released conditions due to a failure in one of said parallel circuits, wherein each one of said parallel circuits includes:
 a wheel deceleration detection circuit,
 a first transistor having its base connected to said detection circuit for supplying a signal response to the wheel deceleration, and
 a second transistor in circuit with said first transistor for providing braking force releasing signal according to the signal from said first transistor, and
 a timer capacitior connected in circuit between said first and second transistors in each one of said parallel circuits for preventing the transmission of said signal from said first transistor to said second transistor after said capacitor has been fully charged.

* * * * *